United States Patent
Lee et al.

(10) Patent No.: US 8,194,000 B2
(45) Date of Patent: Jun. 5, 2012

(54) MULTI PANEL DISPLAY DEVICE

(75) Inventors: Seung-Chul Lee, Gyeonggi-Do (KR); Hyung-Ki Hong, Seoul (KR); Ju-Un Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 880 days.

(21) Appl. No.: 12/256,272

(22) Filed: Oct. 22, 2008

(65) Prior Publication Data
US 2009/0207096 A1   Aug. 20, 2009

(30) Foreign Application Priority Data
Feb. 19, 2008   (KR) .................. 10-2008-0015050

(51) Int. Cl.
*G09G 3/36* (2006.01)
(52) U.S. Cl. ................................... 345/1.3
(58) Field of Classification Search .......... 345/1.3
See application file for complete search history.

(56) References Cited

U.S. PATENT DOCUMENTS

| | | | | |
|---|---|---|---|---|
| 5,751,387 A | * | 5/1998 | Iigahama et al. | 349/95 |
| 2003/0231144 A1 | * | 12/2003 | Cho et al. | 345/1.3 |

* cited by examiner

*Primary Examiner* — Quan-Zhen Wang
*Assistant Examiner* — Tony Davis
(74) *Attorney, Agent, or Firm* — Birch, Stewart, Kolasch & Birch, LLP

(57) ABSTRACT

Disclosed is a multi panel display device comprising, at least two liquid crystal panels connected to each other at positions adjacent to each other and respectively composed of image display portions and non-display portions; and image shift films disposed above each of the liquid crystal panels with being spaced therefrom by a specific distance and connected to each other at positions adjacent to each other respectively have first and second bevels disposed to be symmetrical to each other, wherein the first and second bevels are repeatedly formed to face the display panels.

7 Claims, 7 Drawing Sheets

2 X 2 DISPOSITION

3 X 3 DISPOSITION

MULTI PANEL DISPLAY DEVICE

RELATED APPLICATION

The present disclosure relates to subject matter contained in priority Korean Application No. 10-2008-015050, filed on Feb. 19, 2008, which is herein expressly incorporated by reference in its entirety.

BACKGROUND OF THE INVENTION

1. Field of the Invention

The present invention relates to a multi panel display device, and particularly, to a multi panel display device which is capable of implementing one large screen by visually removing non-display areas between a plurality of displays resulting from optically refracting display light radiated from the display device.

2. Background of the Invention

In general, a method for configuring one large screen using two or more displays is applied to a large display device. However, currently, as a function such as a wireless Internet is added to a portable display device, a need for a large screen has been increased. Since the large screen is not suitable for the portable display device in aspects of a size or mobility, a multi display device to which a folding type display is applied has been proposed.

Generally, a flat panel display is used for the portable display device. The flat panel display may be implemented as a Liquid Crystal Display (LCD), a Field Emission Display (FED), a Plasma Display Luminescent), or the like.

A multi panel display device which is capable of implementing a large screen by connecting a plurality of liquid crystal panels to each other in accordance with the related art will be explained with reference to FIG. 1.

FIG. 1 is a front view schematically showing a multi panel display device implementing a large screen by connecting a plurality of liquid crystal panels to each other in accordance with the related art.

Referring to FIG. 1, the multi panel display device in the related art implements a large screen by connecting liquid crystal panels 10a and 10b respectively including a lower array substrate (not shown), an upper color filter substrate (not shown), a liquid crystal layer (not shown) and a backlight (not shown) providing display light to be adjacent to each other.

Here, bezels 13a and 13b, non-display areas of the screen, are formed on the large screen of the multi panel display device.

With the configuration, upon radiating light from the backlight (not shown), the light is transmitted to image display areas on the screen of each liquid crystal panel 10a, 10b, and accordingly images 11a and 11b are displayed on the screen. However, the light is not transmitted to the bezels 13a and 13b, non-display areas, and accordingly the bezels 13a and 13b are displayed in black lines when watching the multi panel display device in a front side thereof.

Even though it is not shown in the drawings, a method for removing the black lines is proposed as follows. The large screen is configured by respectively disposing transparent optical lenses (not shown) on the plurality of liquid crystal panels (not shown) connected to each other at positions adjacent to each other.

Here, the bezels (not shown), non-display areas of the screen, are formed on the large screen of the multi panel display device.

With the configuration, upon radiating light from the backlight (not shown), the light is transmitted to an active area (not shown) on the screen of each liquid crystal panel (not shown), and accordingly images are displayed on the screen through the planar portions of the optical lenses (not shown). And, since the light is refracted in a specific direction through curved portions of the optical lenses (not shown) and then passes through the lenses, it is also transmitted toward the curved portions of the optical lenses (not shown) disposed on the bezels (not shown), non-display areas.

Accordingly, when watching the multi panel display device in the front side thereof, images are partially displayed on portions adjacent to the upper portion of the bezels, thereby reducing occurrence of the black lines.

However, the multi panel display device in the related art has the following problems.

In the multi panel display device in the related art, when disposing optical devices formed of a transparent material such as glass, a transparent resin for serving as lenses in front of the entire large screen or each of the arranged display unit screens, it is difficult to fix the optical devices on the display of the large screen due to the size or weight of the lenses, and image quality may be deteriorated because an edge image distortion phenomenon due to the lenses are partially worsened at a viewing angle. Especially, in case that the multi panel display device becomes large such as a current flat TV, the area of the bezels between the panels increases as well as a thickness of a lens of the entire screen, accordingly it is not applicable thereto.

SUMMARY OF THE INVENTION

Therefore, an object of the present invention is to provide a multi panel display device which is capable of implementing a large screen on which bezels between panels are not displayed and virtual images don't exist thereon.

To achieve these and other advantages and in accordance with the purpose of the present invention, as embodied and broadly described herein, there is provided a multi panel display device comprising, at least two liquid crystal panels connected to each other at positions adjacent to each other and respectively composed of image display portions and non-display portions; and image shift films disposed above each of the liquid crystal panels with being spaced therefrom by a specific distance and connected to each other at positions adjacent to each other respectively have first and second bevels disposed to be symmetrical to each other, wherein the first and second bevels are repeatedly formed to face the display panels.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
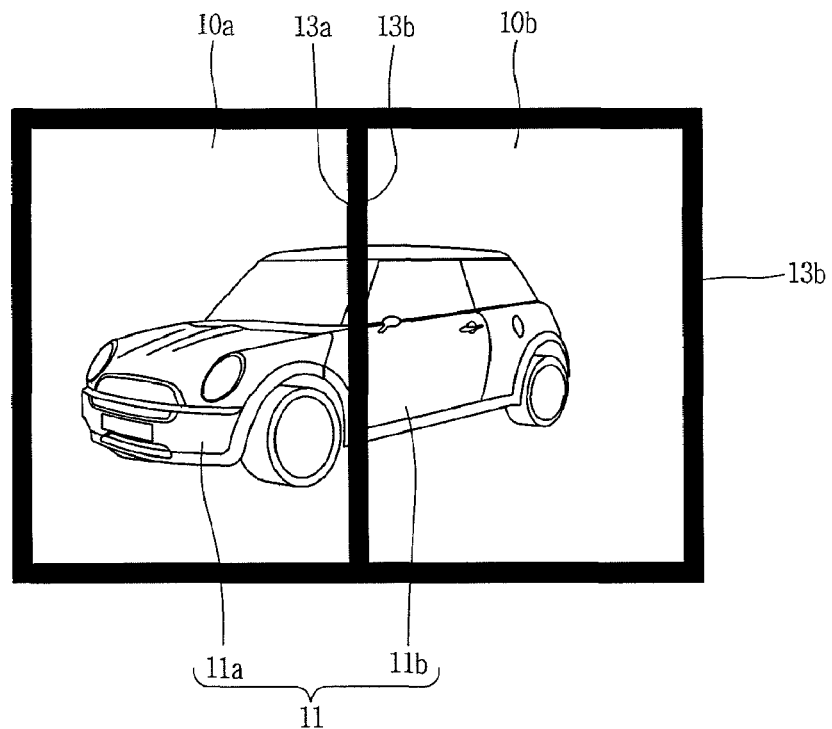
FIG. 1 is a front view schematically showing a multi panel display device implementing a large screen by connecting a plurality of liquid crystal panels to each other in accordance with the related art.
Figure 2:
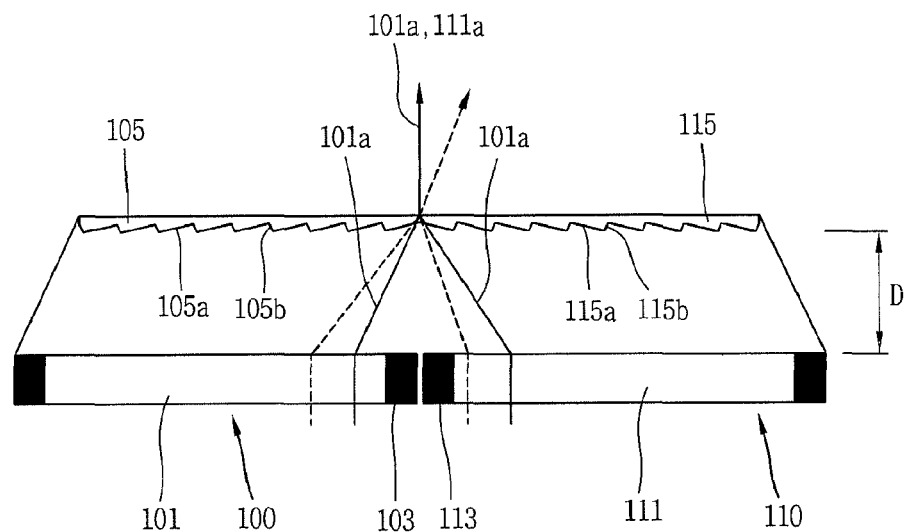
FIG. 2 is a section view schematically showing a multi panel display device in accordance with the present invention, in which image shift films are disposed above upper ends of liquid crystal panels.

FIG. 2 is a section view schematically showing a multi panel display device in accordance with the present invention, in which image shift films are disposed above upper ends of liquid crystal panels.

As shown in FIG. 2, the multi panel display device in accordance with the present invention is configured with a plurality of liquid crystal panels 100 and 110 connected to each other. The liquid crystal panels 100 and 110 are provided with upper and lower substrates (not shown). Electrodes (not shown) are formed on the upper and lower substrates (not shown). And, image shift films 105 and 115 are disposed above upper sides of the plurality of liquid crystal panels 100 and 110 with being spaced therefrom by a specific distance (D) therebetween.

Here, the display device may be implemented as a liquid crystal device, an EL device, etc. In case of the liquid crystal device, a liquid crystal layer is further provided in addition to the substrates and electrodes. And, in case of the EL device, an organic light emitting layer is further provided in addition to the substrates and electrodes. However, these are not directly related to the present invention, so will be omitted.

Also, the liquid crystal panels 100 and 110 respectively include image display areas 101, 111 and non-display areas, i.e., bezels 103 and 113. The bezels 103 and 113, i.e., non-display areas, are formed on outer circumferential surfaces of the image display areas 101 and 111. Here, the bezels 103 and 113 are provided with a sealant (not shown) for sealing the upper and lower substrates of the liquid crystal panels and correspond to areas in which images are not displayed.

And, the image shift films 105 and 115 are formed in a film shape so as to be easily mounted above the upper ends of the liquid crystal panels 100 and 110 with being spaced therefrom by the specific distance (D) therebetween. First bevels 105a, 115a having a first inclined angle and second bevels 105b and 115b having a second inclined angle are repeatedly formed on surfaces of the image shift films 105 and 115.

And, the first bevel 105a of the first image shift film 105 disposed above the upper end of the first liquid crystal panel 100 is symmetrical to the first bevel 115a of the second image shift film 115 disposed above the upper end of the second liquid crystal panel 110.

Thus, as shown in FIG. 2, when light proceeds from lower portions of the liquid crystal panels 100 and 110 to upper portions thereof, a light path is refracted toward the bezels 103 and 113 of the liquid crystal panels 100 and 110, i.e., in directions of arrows in the drawing, accordingly the bezels 103 and 113, non-display areas, look smaller.

This phenomenon indicates that the light is refracted at the first bevels 105a and 115a of the first and second image shift films 105 and 115 and thus the light path is refracted in a specific angle. This phenomenon uses a difference in refractive index of the proceeding light between two media.

The phenomenon using the difference in refractive index between two media will be explained with reference to FIGS. 3a and 3b.

Figure 3A:
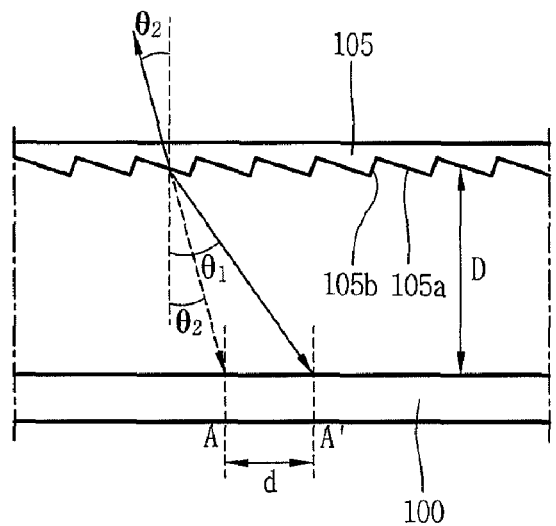
FIG. 3a is a section view schematically showing image shift using the image shift film provided in the multi panel display device in accordance with the present invention.

FIG. 3a is a section view schematically showing image shift using the image shift film in the multi panel display device in accordance with the present invention.

Figure 3B:
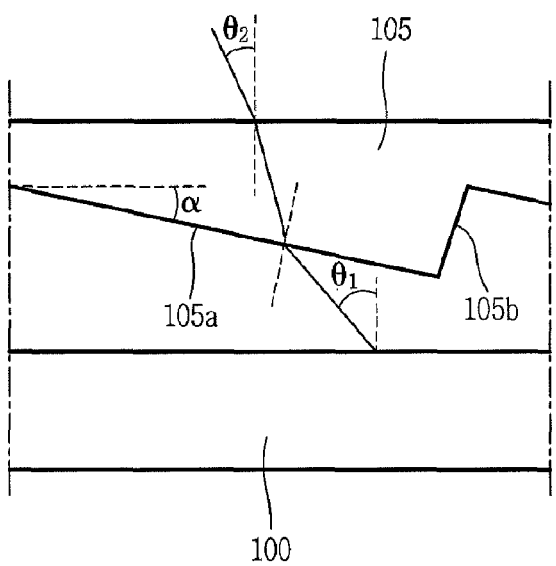
FIG. 3b is a section view schematically showing a change of a light path according to an angle (α) of a bevel of the image shift film provided in the multi panel display device in accordance with the present invention.

FIG. 3b is a section view schematically showing a change of a light path according to an angle (α) of the image shift film provided in the multi panel display device in accordance with the present invention.

As shown in FIG. 3a, the first bevels 105a of the image shift film 105 serve to change the direction of light, accordingly a user recognizes that an image at a position A' is located at a position A.

Here, an image shift distance (i.e., distance between A-A'; d), as shown in Formula 1, depends on a distance (D) between the first bevels 105a and the liquid crystal panel 100, an incline angle (α) of the first bevels 105a and a viewing angle (θ2).

$$d = D(\tan\theta_1 - \tan\theta_2) \quad \text{Formula 1}$$

$$\sin\theta_2 = n \sin\{\sin[\sin(\theta_1+\alpha)/n] - \alpha\} \quad \text{Formula 2}$$

Here, the incline angle (α) of the first bevels 105a is in a range of 1☐35°.

And, as shown in Formulas 1 and 2, the distance (D) between the first bevels 105a of the image shift film 105 and the liquid crystal panel 100 depends on the image shift distance (i.e., distance between A-A'; d). The distance (D) between the first bevels 105a and the liquid crystal panel 100 is twice to three times of the image shift distance (i.e., distance between A-A'; d) or more than. That is, the distance (D) is 1 cm or more than, preferably.

Accordingly, as shown in FIG. 3b, the image shift distance is equal when the angle (α) of the first bevels 105a of the image shift film 105 is small or the multi panel display device is viewed in an angle perpendicular to the liquid crystal panel 100, accordingly distortion of the image does not occur.

Figure 4:
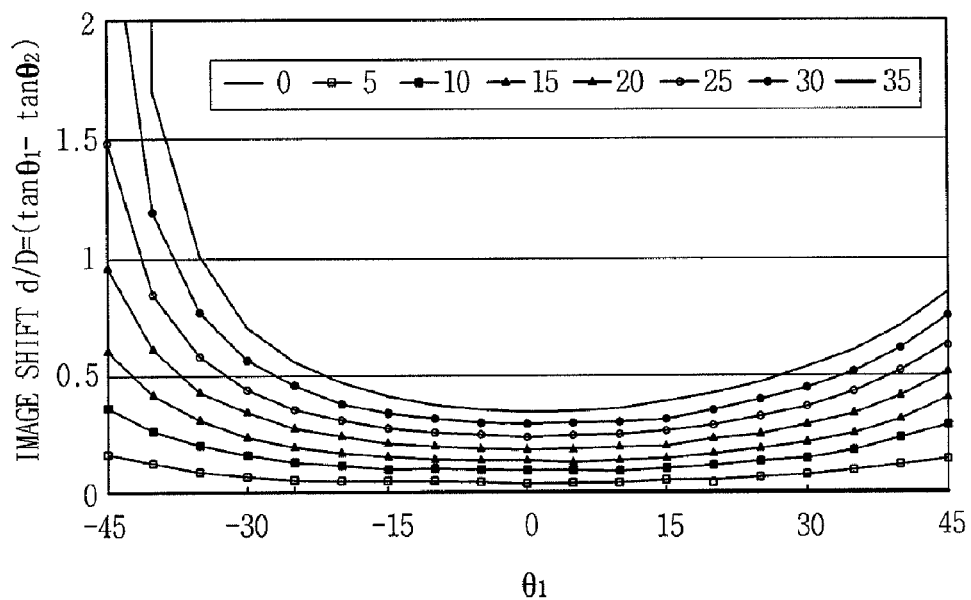
FIG. 4 is a graph showing changes of image shift values (d/D=(tan θ1−tan θ2) according to angles (θ1) between a liquid crystal panel and a first bevel of the image shift film, i.e., a point perpendicular to a liquid crystal panel, where light is refracted.

Meanwhile, FIG. 4 shows changes of image shift values (i.e., d/D=(tan θ1−tan θ2) according to angles (θ1) between the liquid crystal panel 100 and the first bevels 105a of the liquid crystal panel 104, i.e., a position perpendicular to the liquid crystal panel 100, where light is refracted.

As shown in FIG. 4, the image shift distance is equal when the angle (θ1) between the liquid crystal panel 100 and the first bevels 105a of the image shift film 105 is within a range of approximately ±25°, accordingly the distortion of the image does not occur.

Figure 5:
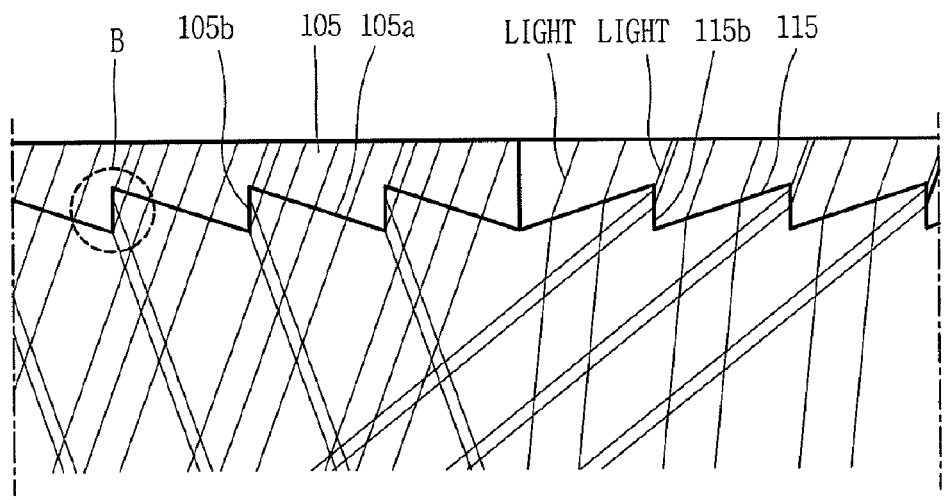
FIG. 5 is a schematic view showing a change of a light path on second bevels of the image shift films, in the multi panel display device in accordance with the present invention.

FIG. 5 is a schematic view showing a change of a light path at the second bevels of the image shift film, in the multi panel display device in accordance with the present invention.

Figure 6:
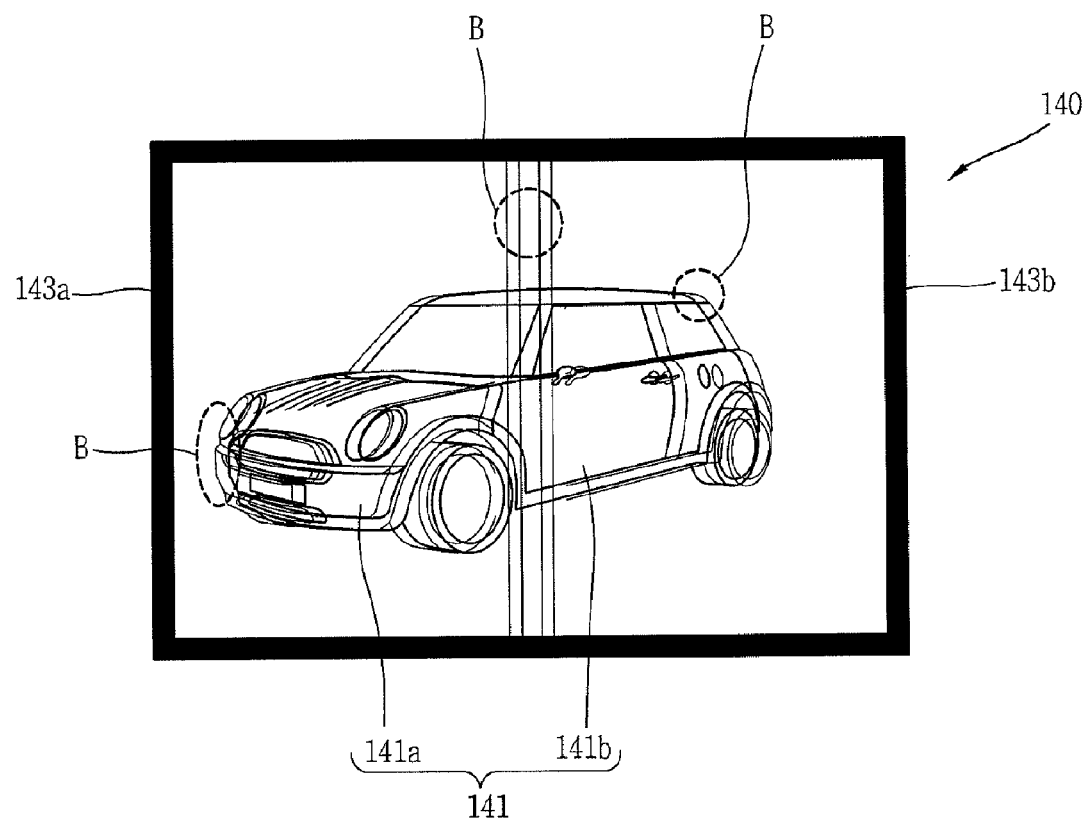
FIG. 6 is a front view schematically showing the multi panel display device which is capable of implementing a large screen by connecting a plurality of liquid crystal panels in accordance with the present invention, in which a bezel is not viewed but a virtual image exists.

FIG. 6 is a front view schematically showing the multi panel display device which is capable of implementing a large screen by connecting a plurality of liquid crystal panels in accordance with the present invention, in which a bezel does not viewed but a virtual image exists.

As shown in FIG. 5, the image of the liquid crystal panel (not shown) is partially shifted toward the bezel 103 by the first bevels 105a of the image shift film 105. At this time, if the second bevels 105b opposite to the first bevels 105a are transparent, light incident onto the second bevels 105b is refracted and then a light path by which the virtual image (B) exists is formed. That is, the light radiated to the liquid crystal panel (not shown) is refracted at the second bevels 105b of the image shift film 105 and then has a path different from the light path at the first bevels 105a.

Accordingly, as shown in FIG. 6, the virtual image (B) is displayed on the image 141 displayed on the screen of the multi panel display device 140 by the light path refracted at the second bevels 105b.

Figure 7:
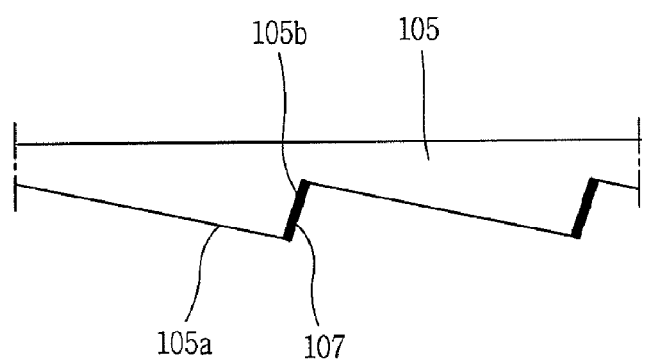
FIG. 7 is a schematic view showing a section of second bevels of an image shift film, the second bevels having been processed to be opaque, in the multi panel display device in accordance with the present invention.
Figure 8:
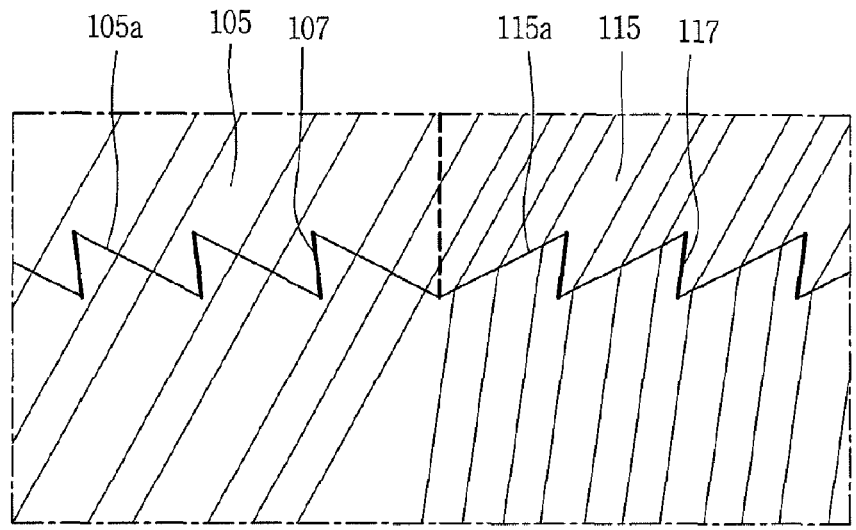
FIG. 8 is a schematic view showing that a light path is not changed resulting from that light transmission is not performed at the second bevels of the image shift film, in the multi panel display device in accordance with the present invention.

In order to remove the virtual image (B) by another light path, as shown in FIG. 7, the second bevels 105b of the image shift film 105 is processed to be opaque using a BM or other opaque material thereon so that light can be absorbed thereon or cannot be passed therethrough, whereby removing the light path of the virtual image, as shown in FIG. 8.

Figure 9:
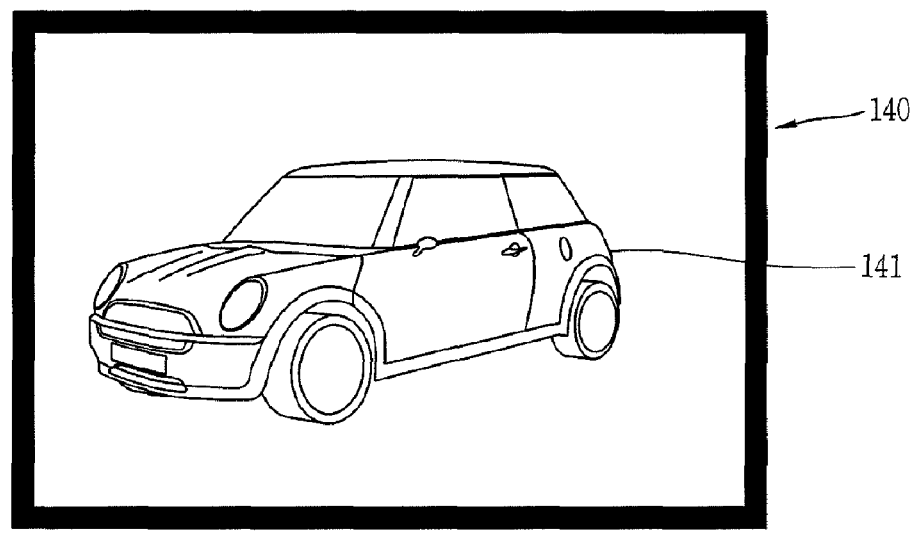
FIG. 9 is a front view schematically showing that a black line and a visual image don't exist at a central portion of a screen of the multi panel display device in accordance with the present invention.

As aforementioned, in order to implement a large screen using the multi panel display device in accordance with the present invention, when image shift films are respectively disposed on the plurality of liquid crystal panels connected to each other and then the first bevels and the second bevels which have been processed to be opaque are repeatedly formed on the surfaces of the image shift films, as shown in FIG. 9, the existing black lines are removed at the bezels where the plurality of liquid crystal panels are connected to each other and the virtual image does not exist, accordingly it is capable of implementing the image 141 on the screen 140 with high definition.

Also, the image shift film 105 may be integrally formed regardless of the number of the liquid crystal panels if necessary. Here, when forming the image shift film 105 to be integral with the plurality of liquid crystal panels connected to each other at positions adjacent to each other, first bevels are symmetrical to each other on the basis of the bezels between the liquid crystal panels.

FIGS. 10a to 10d show other embodiments of the present invention, implementing multi panel display devices by connecting the plurality of liquid crystal panels.

Figure 10A:
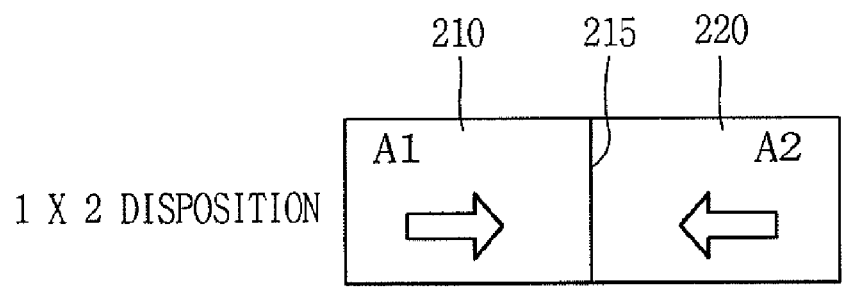
FIG. 10a is a schematic view showing a multi panel display device in which two liquid crystal panels are connected to each other in accordance with one exemplary embodiment of the present invention.

FIG. 10a is an exemplary view showing a multi panel display device by connecting two liquid crystal panels 210 and 220 to each other (i.e., 1 row*2 columns).

Here, as shown in FIG. 10a, image shift films (not shown) in which the first bevels and the opaque second bevels are repeatedly formed are disposed above the two liquid crystal panels 210 and 220 with being spaced therefrom by a specific distance therebetween. In the image shift films (not shown), the first bevels are symmetrical to each other.

Thus, as shown in FIG. 10a, images are shifted in directions of arrows, that is toward a bezel 215 where the two liquid crystal panels 210 and 220 are connected to each other, by the first bevels and the opaque second bevels of the image shift films, accordingly the images are also displayed on the bezel 215 and a virtual image does not exist, thereby implementing images with high definition.

Figure 10B:
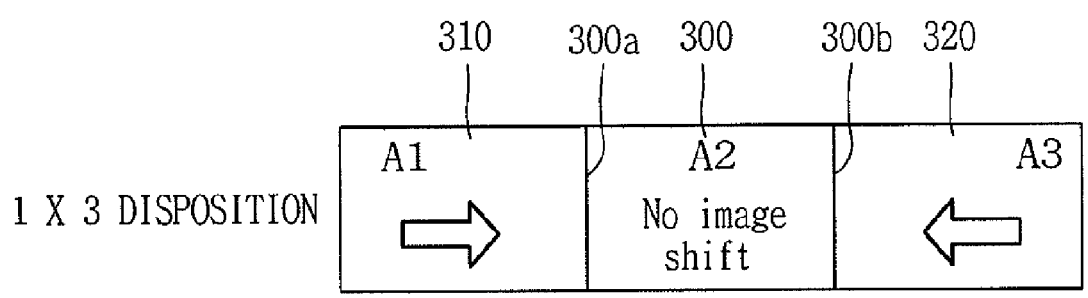
FIG. 10b is a schematic view showing of a multi panel display device in which three liquid crystal panels are connected to each other in accordance with another exemplary embodiment of the present invention.

Meanwhile, FIG. 10b is another exemplary view showing a multi panel display device by connecting three liquid crystal panels 300, 310 and 320 to each other (i.e., 1 row*3 columns).

Here, as shown in FIG. 10b, an image shift film (not shown) is not disposed above the upper side of the first liquid crystal panel 300 disposed at a center among the three liquid crystal panels 300, 310 and 320. However, there are image shift films (not shown) disposed above the upper sides of the second and third liquid crystal panels 310 and 320 respectively connected to both lateral surfaces of the first liquid crystal panel 300. Here, in the image shift films (not shown), first bevels and opaque second bevels are repeatedly formed with being spaced therefrom by a specific distance therebetween. And, the first bevels are symmetrical to each other in the image shift films (not shown).

Thus, as shown in FIG. 10b, images are shifted in directions of arrows, that is toward bezels 300a and 300b at both lateral surfaces of the first liquid crystal panel 300 connected to the two liquid crystal panels 310 and 320, by the fast bevels and the opaque second bevels of the image shift films (not shown), accordingly the images are also displayed on the bezels 300a and 300b and a virtual image does not exist, thereby implementing images with high definition.

Figure 10C:
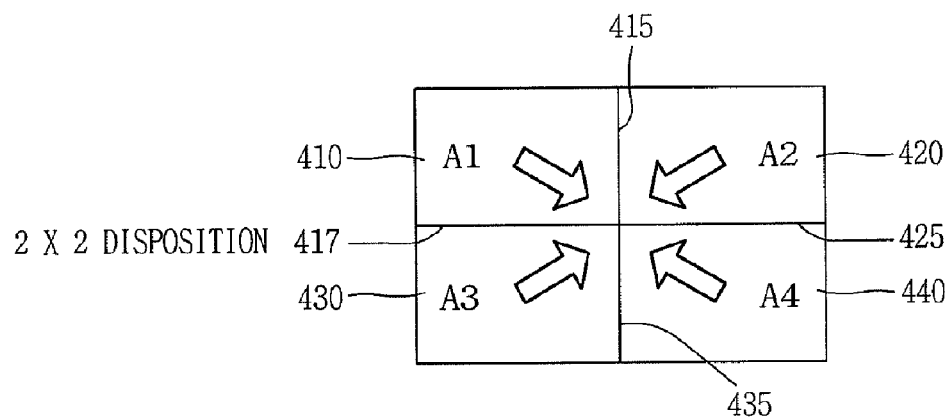
FIG. 10c is a schematic view showing of a multi panel display device in which four liquid crystal panels are connected to each other in accordance with still another exemplary embodiment of the present invention.

Meanwhile, FIG. 10c is still another exemplary view showing a multi panel display device by connecting four liquid crystal panels 410, 420, 430 and 440 to each other (i.e., 2 rows*2 columns).

Here, as shown in FIG. 10c, image shift films (not shown) in which first bevels and opaque second bevels are repeatedly formed are disposed above upper sides of the four liquid crystal panels 410, 420, 430 and 440 connected to each other, with being spaced from the liquid crystal panels 410, 420, 430 and 440 by a specific distance therebetween. In each of the image shift films (not shown), the first bevels are symmetrical to each other.

Thus, as shown in FIG. 10c, images are shifted in directions of arrows, that is toward bezels 415, 417, 425 and 435 where the four liquid crystal panels 410, 420, 430 and 440 are connected to each other, by the first bevels and the opaque second bevels of the image shift films (not shown), accordingly the images are also displayed on the bezels 415, 417, 425 and 435 and a virtual image does not exist, thereby implementing images with high definition.

Figure 10D:
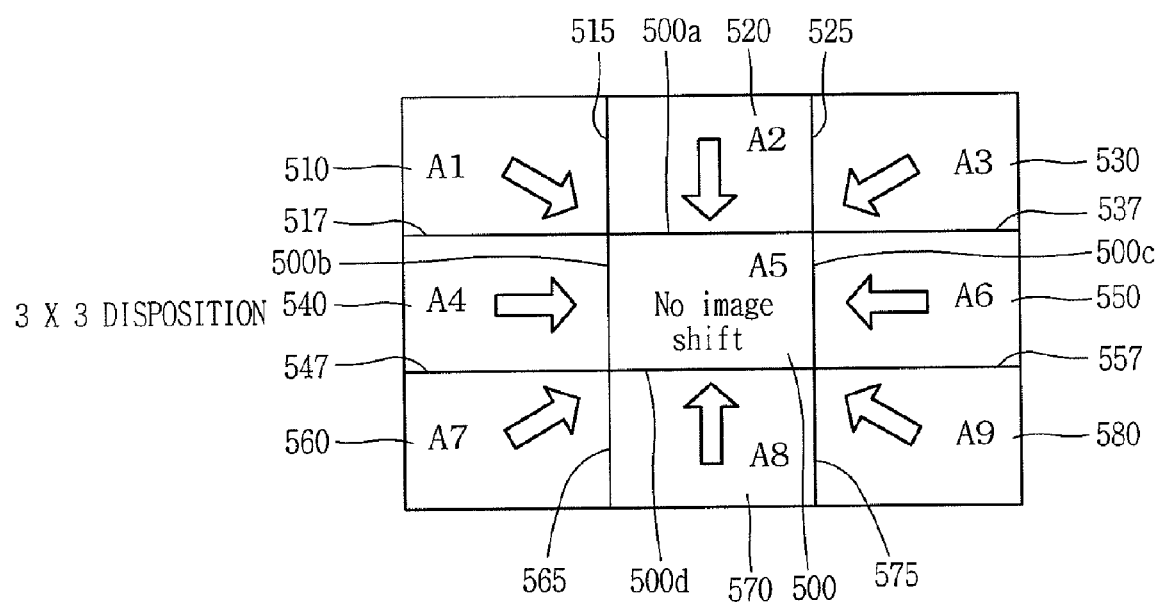
FIG. 10d is a schematic view showing a multi panel display device in which nine liquid crystal panels are connected to each other in accordance with yet still another exemplary embodiment of the present invention.

Meanwhile, FIG. 10d is yet still another exemplary view showing a multi panel display device by connecting nine liquid crystal panels 500, 510, 520, 530, 540, 550, 560, 570 and 580 to each other (i.e., 3 rows*3 columns).

Here, as shown in FIG. 10d, an image shift film (not shown) is not disposed above the upper side of the first liquid crystal panel 500 disposed at a center among the nine liquid crystal panels 500, 510, ..., 570 and 580. However, there are image shift films (not shown) disposed above the upper sides of a plurality of liquid crystal panels 510, 520, 530, 540, 550, 560, 570 and 580 respectively connected to lateral surfaces of the first liquid crystal panel 500, with being spaced from the plurality of liquid crystal panels 510 to 580 by a specific distance therebetween. Here, in the image shift films (not shown), first bevels and opaque second bevels are repeatedly formed. And, in each of the image shift films (not shown), the first bevels are symmetrical to each other.

Thus, as shown in FIG. 10d, images are shifted in directions of arrows, that is toward bezels 500a, 500b, 500c and 500d of lateral surfaces of the first liquid crystal panel 500, the bezels 500a, 500b, 500c and 500d connected to bezels 515, 517, 525, 537, 547, 557, 565 and 575 between the eight liquid crystal panels 510, 520, 530, 540, 550, 560, 570 and 580, by the first bevels and the opaque second bevels of the image shift films (not shown), accordingly the images are displayed on all of the bezels 500a, 500b, 500c, 500d, 515, 517, 525, 547, 557, 565 and 575, and a virtual image does not exist, thereby implementing images with high definition.

In addition to the multi panel display devices implemented in formats of 1 row*2 columns, 1 row*3 columns, 2 rows*2 columns and 3 rows*3 columns, it is capable of implementing the multi panel display device formed in m row(s)*n column (s) (here, m refers to 1~10, and n refers to 1~10) if necessary.

As aforementioned, the multi panel display device in accordance with the present invention has the following effects.

In the multi panel display device in accordance with the present invention, the image shift films in which transparent first bevels and opaque second bevels are repeatedly formed are disposed above each upper end of the plurality of liquid crystal panels connected to each other at positions adjacent to each other, accordingly the images can be displayed on the bezels as well as the image display areas of the liquid crystal panels.

Accordingly, it is capable of displaying a large image having a high definition since the bezels does not displayed on the screen resulting from disposing the image shift films in which transparent first bevels and opaque second bevels are repeatedly formed, above each upper end of the plurality of liquid crystal panels connected to each other at positions adjacent to each other.

Also, in the multi panel display device in accordance with the present invention, when disposing the image shift films in which first bevels and second bevels are repeatedly formed above each upper end of the plurality of liquid crystal panels connected to each other at positions adjacent to each other, the second bevels are processed to be opaque. Accordingly, removed is the light path of virtual images existing at the opposite side of the first bevels of the image shift films for shifting images.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A multi panel display device comprising:
    at least two liquid crystal panels connected to each other at positions adjacent to each other and respectively composed of image display portions and non-display portions; and
    image shift films disposed above each of the liquid crystal panels with being spaced therefrom by a specific distance, and connected to each other at positions adjacent to each other respectively, the image shift films having first and second bevels disposed to be symmetrical to each other, wherein the first and second bevels are repeatedly formed to face the liquid display panels,
    wherein the first bevels have a first inclined angle and the second bevels have a second inclined angle, and
    wherein the second bevels have an opaque property to remove a virtual image at the non-display portions between the two liquid crystal panels.

2. The display device of claim 1, wherein the second bevels are formed of a BM or other opaque material.

3. The display device of claim 1, wherein a distance between the display panels and the image shift films is twice to three times of a width of non-display panels between the display panels connected to each other at positions adjacent to each other or more than.

4. The display device of claim 1, wherein an inclined angle of the first and second bevels is in a range of 1 to 35°.

5. The display device of claim 1, wherein the image shift films are disposed above the upper ends of the plurality of display panels excluding a central display panel, in the multi panel display device formed of the plurality of display panels in formats of 1 row*3 columns and 3 rows*3 columns.

6. The display device of claim 1, wherein light radiated to the liquid crystal panel is refracted at the second bevel of the image shift film and has a path different from the light path at the first bevel.

7. The display device of claim 1, wherein the first bevels and the second bevels are comprised of a single body with the image shift film.

* * * * *